United States Patent
Egerton et al.

[15] 3,639,132
[45] Feb. 1, 1972

[54] TITANIUM DIOXIDE CERAMIC COMPOSITION AND HOT-PRESSING METHOD FOR PRODUCING SAME

[72] Inventors: Lawson Egerton, Sarasota, Fla.; John Thomson, Jr., Spring Lake, N.J.

[73] Assignee: Bell Telephone Laboratories, Incorporated, Murray Hill, N.J.

[22] Filed: Apr. 13, 1970

[21] Appl. No.: 27,893

[52] U.S. Cl. ..........................106/39 R, 252/507, 264/332, 333/70
[51] Int. Cl. ......................................................C04b 33/00
[58] Field of Search................106/39 R, 46, 55; 264/61, 65, 264/319; 252/507; 264/332; 333/70

[56] References Cited

UNITED STATES PATENTS

| | | | |
|---|---|---|---|
| 3,459,503 | 8/1969 | Roy et al. | 106/55 X |
| 2,305,327 | 12/1942 | Thurnauer | 106/39 R |
| 3,534,286 | 10/1970 | Holm et al. | 106/39 R |
| 2,576,379 | 11/1951 | Woodcock et al. | 106/39 R |
| 2,369,266 | 2/1945 | Thurnauer | 106/39 R |
| 2,289,211 | 7/1942 | Ridgway | 106/39 R |
| 2,852,400 | 9/1958 | Remeika | 106/39 R |

OTHER PUBLICATIONS

Cohen, S. B. et al.; Frequency Timing of Rutile Resonators, in PROC IEEE, March 1966 pp. 413–414.

*Primary Examiner*—James E. Poer
*Assistant Examiner*—W. R. Satterfield
*Attorney*—R. J. Guenther and Edwin B. Cave

[57] ABSTRACT

A polycrystalline ceramic body of rutile ($TiO_2$) has been produced which has a density of at least 4.23 grams per cubic centimeter (99.5 percent of theoretical density) and an electrical quality factor of at least 10,000 at frequencies in the gigaHertz range. The body is produced by hot pressing $TiO_2$ under reducing conditions, the $TiO_2$ containing minor amounts of certain trivalent cations such as $Fe^{3+}$, followed by heating in oxygen and slow cooling. Applications include use as a dielectric resonator in microwave filters.

7 Claims, 3 Drawing Figures

TITANIUM DIOXIDE CERAMIC COMPOSITION AND HOT-PRESSING METHOD FOR PRODUCING SAME

FIELD OF THE INVENTION

This invention relates to a polycrystalline ceramic composition which is useful as a dielectric resonator material, and also relates to a method for producing it and to devices using it.

PRIOR ART

Dielectric resonators are of significance in microwave technology, some specific applications including band-pass, band-reject and directional filters and delay elements. Such resonators advantageously exhibit small size (high dielectric constant) and low electrical loss (high electrical quality factor).

Polycrystalline ceramic rutile has been considered for use as a core material to achieve some miniaturization of microwave filters, due to its favorable dielectric constant (about 80 to 100) and low loss at microwave frequencies (a quality factor of about 2,900 at 1 gigahertz is commonly reported). It has been estimated that filters incorporating high-quality ceramic rutile resonators would result in a size reduction of at least one-fifth when compared to filters having air-filled resonant cavities.

Unfortunately a convenient method for producing polycrystalline rutile having suitable dielectric properties is lacking. Conventional hot pressing which is carried out in an air atmosphere presents a conflict between high hot-pressing temperatures required for densification and high-temperature strength limitations of presently available hot pressing equipment. Accordingly, the highest densities which have so far been obtained by hot pressing rutile conventionally are only about 96 to 98 percent of theoretical density with consequent wide variations of electrical properties on a sample-to-sample basis.

The search continues for ways to consistently produce high-quality polycrystalline rutile for dielectric use.

SUMMARY OF THE INVENTION

Polycrystalline ceramic rutile ($TiO_2$) having the highest consistently reproducible values of density and electrical quality factor yet seen for this material, has been produced by; hot pressing under reducing conditions $TiO_2$ powder to which has been added minor amounts of certain oxides of trivalent cations (for example, $Fe_2O_3$), followed by heating the densified material in an atmosphere containing oxygen, followed by slow cooling.

The polycrystalline material produced according to the invention consistently exhibits densities of at least 4.23 grams per cubic centimeter (99.5 percent of theoretical density) and quality factors of at least 10,000. This material is suitable for use in a variety of applications including use as dielectric resonators in microwave filters and delay elements.

DETAILED DESCRIPTION

Figure 1:
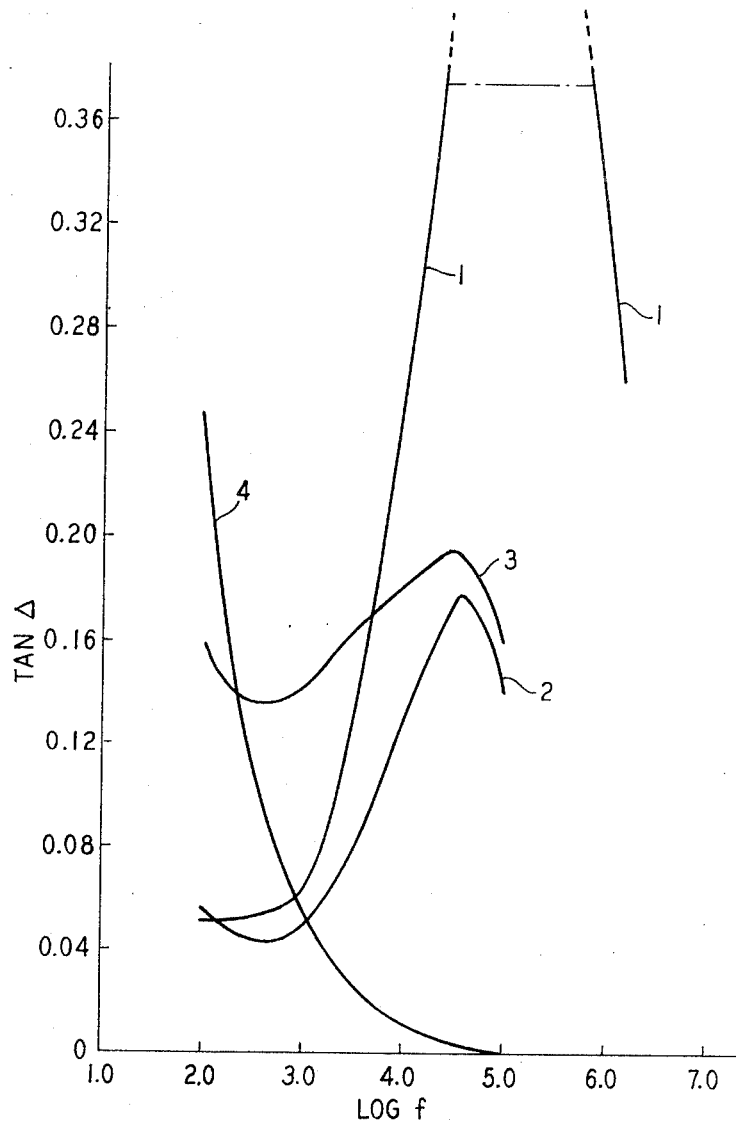
FIG. 1 is a graph of electrical loss (tan Δ) versus log of frequency for polycrystalline bodies of rutile containing varying amounts of $Fe_2O_3$.

The dense polycrystalline ceramic body of the invention is essentially rutile containing a controlled amount of from about 0.1 to 0.5 weight percent of one or more of the oxides $Fe_2O_3$, $Cr_2O_3$, $Al_2O_3$ and $Co_2O_3$, below which oxide content consistently reproducible values of electrical quality factor are not readily obtainable. Little advantage is obtained by adding the oxides in amounts greater than about 0.5 weight percent. Based upon these considerations, oxides in the amount of from 0.2 to 0.3 weight percent total are preferred.

Commercially available starting materials, for example, electrical grade $TiO_2$ will ordinarily be suitable for the practice of the invention, although the combined total of alkali and alkaline earth metals, halogen and carbon from all sources should be kept below about 0.1 weight percent, above which degradation of electrical properties of the final body is likely. The total amount of all impurities from whatever source should, in general, be kept below 0.2 weight percent.

Starting materials as oxides or other compounds which with heating yield oxides, for example, carbonates, should be thoroughly mixed to insure that subsequent reactions take place completely and uniformly. The mixing is customarily carried out by forming an aqueous or organic slurry in a ball mill. The material is then dried, granulated and prereacted by calcining, generally at a temperature of from 1,000° to 1,300° C. for from about 1 to 20 hours. Insufficient calcining may lead to a nonuniform structure in the final body, particularly in the case in which $Fe_2O_3$ is chosen as the additive. Such structure may have a deleterious effect on the attainment of the desired electrical properties. It is preferred not to exceed a calcining temperature of about 1,200° C., particularly for the additives $Fe_2O_3$, $Co_2O_3$ and $Al_2O_3$. Above this temperature significant agglomeration may take place, necessitating pulverization prior to densification. In the case of $Cr_2O_3$, temperatures above 1,200° C. may be required for effective calcining in which case a certain degree of agglomeration cannot be avoided.

It has been found that forming aids such as binders, lubricants and plasticizers are not required to be added prior to densification. However, if it is desired to use forming aids, those containing harmful impurities such as chlorides should be avoided.

After calcining, the mixture should be preformed prior to densification by hot pressing or in the alternative should be hot pressed in dies having protective sleeves and caps to insure against contamination of the $TiO_2$ mixture by the die material. Sleeves and caps could be of any material which is inert to both $TiO_2$ and the die material. Where the die material is graphite or alumina, sleeves and caps could be of molybdenum, platinum or steel. Preforming may typically be carried out in steel dies at about 5,000 p.s.i.

It is essential to the successful practice of the invention that the mixture be hot pressed under substantially nonoxidizing conditions. Although not relied upon to define the invention, it is believed that such conditions promote the formation of anion vacancies in the $TiO_2$ thus facilitating densification. Such conditions may be achieved by the use of an inert atmosphere or a vacuum with an oxide die (for example, $Al_2O_3$) but it is preferred to maintain reducing conditions, either by the use of a graphite or other active metal die material or by employing a reducing atmosphere such as one containing hydrogen.

The hot pressing should be from about 1,100° C. for from 3 to 6 hours to 1,200° C. for about 20 to 40 minutes. Hot pressing at too low a temperature or for too short a time results in insufficient density for reproducible values of electrical properties. Hot pressing at too high a temperature or for too long a time also results in insufficient density due to excessive grain growth.

After densification by hot pressing, it has been found necessary to treat the body in oxygen or in oxygen-enriched air or other gas containing at least 30 percent oxygen in order to achieve the desired electrical properties. It is thought that this is due to the necessity for restoring stoichiometry by reducing the anion vacancies produced during hot pressing.

In general, good results are obtained by heating the body at a temperature of from about 800° to 1,100° C. for about 8 to 100 hours. The extent of treatment necessary to achieve optimum electrical properties is dependent upon the size of the specimen and the amount of oxygen in the atmosphere but may be readily determined by simple experimentation. By way of example and to aid the practitioner, for a disc having a thickness of about 0.15 inch and a diameter of about 0.35 inch, good results are obtained by heating in air at 900° C. for about 40 hours. If the thickness of the disc is increased to 0.20 inch, the time for best results should be increased to about 80 to 100 hours, other conditions remaining the same. Either time or temperature or both may be reduced by subjecting the specimen to elevated oxygen pressure. For example, good results are obtained by treating specimens in an oxygen containing vessel at 1,000 atmospheres of pressure and at a temperature of 1,050° C. for only 8 hours.

After heating in an oxidizing atmosphere, the body must be cooled at a rate not exceeding 200° C. per hour down to a temperature of at least 400° C. in order to substantially retain the benefits of the previous inventive steps. Below 400° C., the rate of cooling may be more rapid, but should not be so rapid as to cause thermal damage to the body. Small thin bodies may be quenched from 400° C. For the achievement of optimum electrical properties, it is preferred to maintain cooling rates not exceeding 100° C. per hour. Such rates are conveniently achieved by use of a furnace cool.

EXAMPLES

General Procedure

Powdered rutile samples, some having various amounts of the inventive additives, were performed into discs about 0.4 inch thick by one inch in diameter by pressing in steel dies at 5,000 p.s.i. The preformed discs were then hot pressed for 30 minutes at 5,000 p.s.i. at various temperatures. The hot pressing was carried out in a graphite die which was lined with molybdenum and inductively heated with an R.F. generator. Nitrogen was maintained in the hot-pressing environment to retard oxidation of the die. The preformed discs were surrounded by zirconium oxide powder to prevent contamination by the molybdenum. After hot pressing and removal of any adherent zirconium oxide, the discs were heat treated in a tubular furnace in which was maintained a gentle flow of oxygen throughout the heating and cooling cycle. The samples were then furnace cooled.

EXAMPLE 1

A thermogravimetric analysis of some of these samples was carried out during heating in oxygen at 840° C. and revealed that a maximum weight gain was achieved after 20 hours and that 90 percent of this weight gain was achieved after 4 hours. After further heating at 900° C. for 16 hours, no further weight gain was observed. However, the DC resistivity increased from $2.6 \times 10^{10}$ to $5.9 \times 10^{11}$ ohms/centimeter.

EXAMPLE 2

Using the above-described procedure, a series of samples was prepared by hot pressing at temperatures of 1,100°, 1,125°, 1,150°, 1,175° and 1,200° C. Densities of 4.23 grams per cubic centimeter (greater than 99.5 percent of theoretical density) were obtained for all of these samples. A sample prepared at 1,150° C. in an oxide die and an oxidizing atmosphere reached only 95.2 percent of theoretical density.

Referring now to the drawing, there is shown in FIG. 1 a graph of electrical loss (tan $\Delta$) (the inverse of the electrical quality factor) versus the log of frequency for $TiO_2$ bodies hot pressed in accordance with the invention and containing varying amounts of $Fe_2O_3$. Curve No. 1, which represents $TiO_2$ containing no $Fe_2O_3$, forms a loss peak at a frequency of about 100 kHz. As is known to those skilled in the art, this loss peak affects the loss behavior of the body at much higher frequencies including those in the microwave range. It is therefore an object of the invention to suppress this loss peak so as to produce bodies having high electrical quality factors in the microwave range. Curves 2 and 3 which represent $TiO_2$ containing 0.01 and 0.05 weight percent $Fe_2O_3$, exhibit some suppression of this loss peak as well as a shift of the peak to lower frequencies. Curve No. 4 representing $TiO_2$ containing 0.1 percent $Fe_2O_3$, exhibits substantially complete suppression of the loss peak and represents the minimum amount of $Fe_2O_3$ or other suitable additive required for acceptable loss values in the microwave range.

Figure 2:
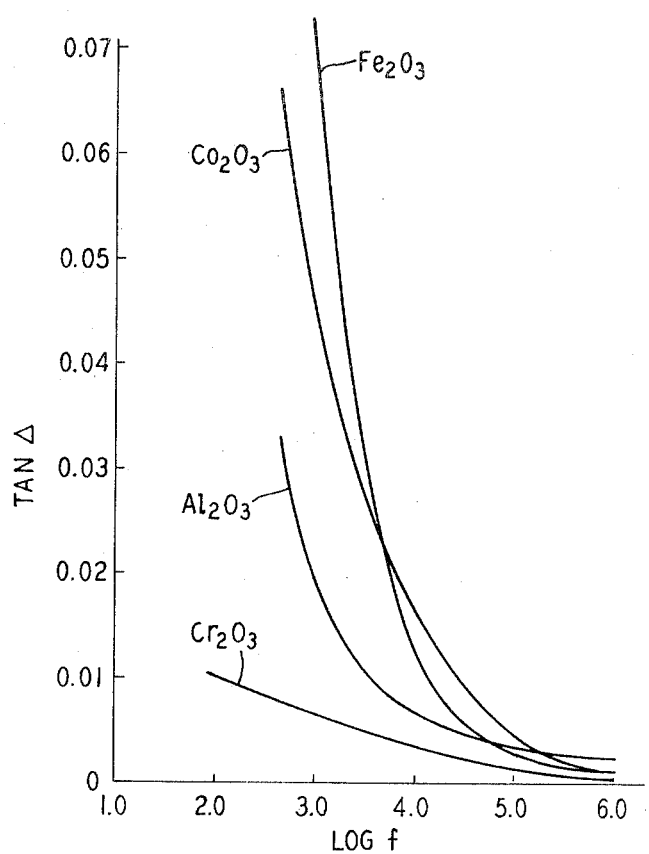
FIG. 2 is a graph of electrical loss (tan Δ) versus log of frequency for polycrystalline rutile containing 0.25 weight percent of various oxides in accordance with the invention.

FIG. 2 is also a graph of tan$\Delta$ versus log of frequency for $TiO_2$ produced in accordance with the invention and containing 0.25 weight percent of various of the oxide additives of the invention. As may be seen from the curves, each of the four additives $Fe_2O_3$, $Co_2O_3$, $Al_2O_3$ and $Cr_2O_3$ are substantially effective in suppressing the characteristic low frequency loss peak.

EXAMPLE 3

Based on the procedure described above, several samples containing various amounts of $Fe_2O_3$ (from 0.1 to 0.5 weight percent) were hot pressed at 1,175° and 1,200° C. After hot pressing, heating in the oxidizing furnace was carried out at 900° C. for 40 hours. Electrical quality factors of 10,000 or greater were consistently obtained. Results for just two representative samples are shown in table 1.

Table I

| Wt. Percent $Fe_2O_3$ | DC Resistivity (ohm/cm.) | Quality Factor Q (tan $\Delta$)$^{-1}$ at 4 GHz. |
|---|---|---|
| 0.1 | $1.6 \times 10^{12}$ | 16,700 |
| 0.5 | $3.7 \times 10^{12}$ | 12,400 |

Figure 3:
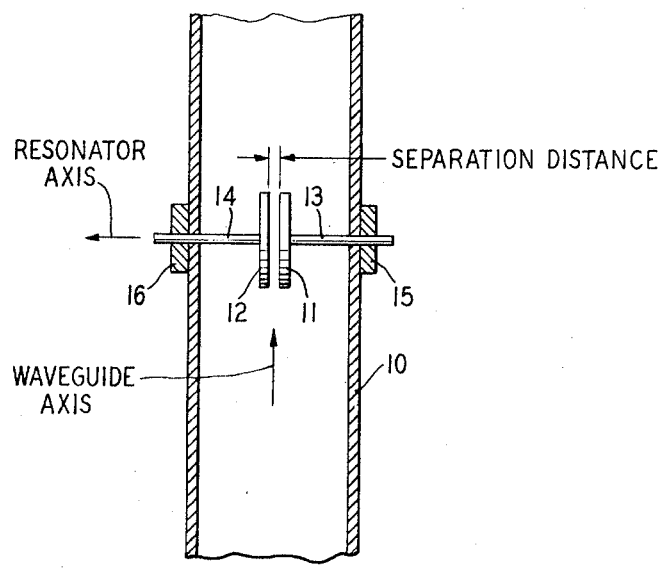
FIG. 3 is a section view of one embodiment of a microwave device incorporating the polycrystalline material of the invention.

Referring now to FIG. 3, there is shown one embodiment of a dielectric resonator incorporating the material of the invention. Within the cavity of waveguide 10 are cylindrical resonator discs 11 and 12 of the material of the invention. These discs are mounted parallel to each other and to the waveguide axis by means of low dielectric constant rods 13 and 14 and clamps 15 and 16. As is well known in the resonator art, means may be provided to vary the distance between these discs.

What is claimed is:

1. A method for producing a polycrystalline body comprising:
    forming a mixture of oxides or compounds which upon heating yield the oxides by combining a first set of constituents equivalent to $TiO_2$ with a second set of constituents equivalent to one or more compounds selected from the group consisting of $Fe_2O_3$, $Cr_2O_3$, $Co_2O_3$ and $Al_2O_3$, said compounds being present in the amount of from 0.1 to 0.5 weight percent of the final body;
    calcining the mixture at a temperature of from about 1,000° C. to 1,300° C. for from about 1 to 20 hours;
    hot pressing the calcined material at a temperature of from about 1,100° C. for from 3 to 6 hours to about 1,200° C. for from 20 to 40 minutes in a substantially nonoxidizing atmosphere so as to form the material into a polycrystalline body;
    heating the body in an oxygen atmosphere under such conditions as to result in substantial oxidation of the body; and
    cooling the body at a rate of up to 200° C. per hour to a temperature of 400° C.

2. The method of claim 1 in which the compounds are present in the amount of from 0.2 to 0.3 weight percent of the final body.

3. The method of claim 1 in which the compound is $Fe_2O_3$.

4. The method of claim 1 in which heating the body in an oxygen atmosphere is carried out at a temperature of from 800° to 1,100° C. for from 8 to 100 hours in an atmosphere containing at least 30 percent oxygen.

5. The method of claim 1 in which the compound is selected from the group consisting of $Fe_2O_3$, $Co_2O_3$ and $Al_2O_3$, and in which calcining is carried out at a temperature of from about 1,000° to 1,200° C.

6. A hot pressed polycrystalline body consisting essentially of from 0.1 to 0.5 weight percent of one or more compounds selected from the group consisting of $Fe_2O_3$, $Cr_2O_3$, $Co_2O_3$ and $Al_2O_3$, remainder $TiO_2$, said body having a density of at least 4.23 grams per cubic centimeter and an electrical quality factor of at least 10,000 at a frequency of 1 gigahertz.

7. The body of claim 6 in which the compound is present in the amount of from 0.2 to 0.3 weight percent.

* * * * *